Z. KING.
Iron Truss-Bridges.
No. 6,026. Reissued Aug. 25, 1874.
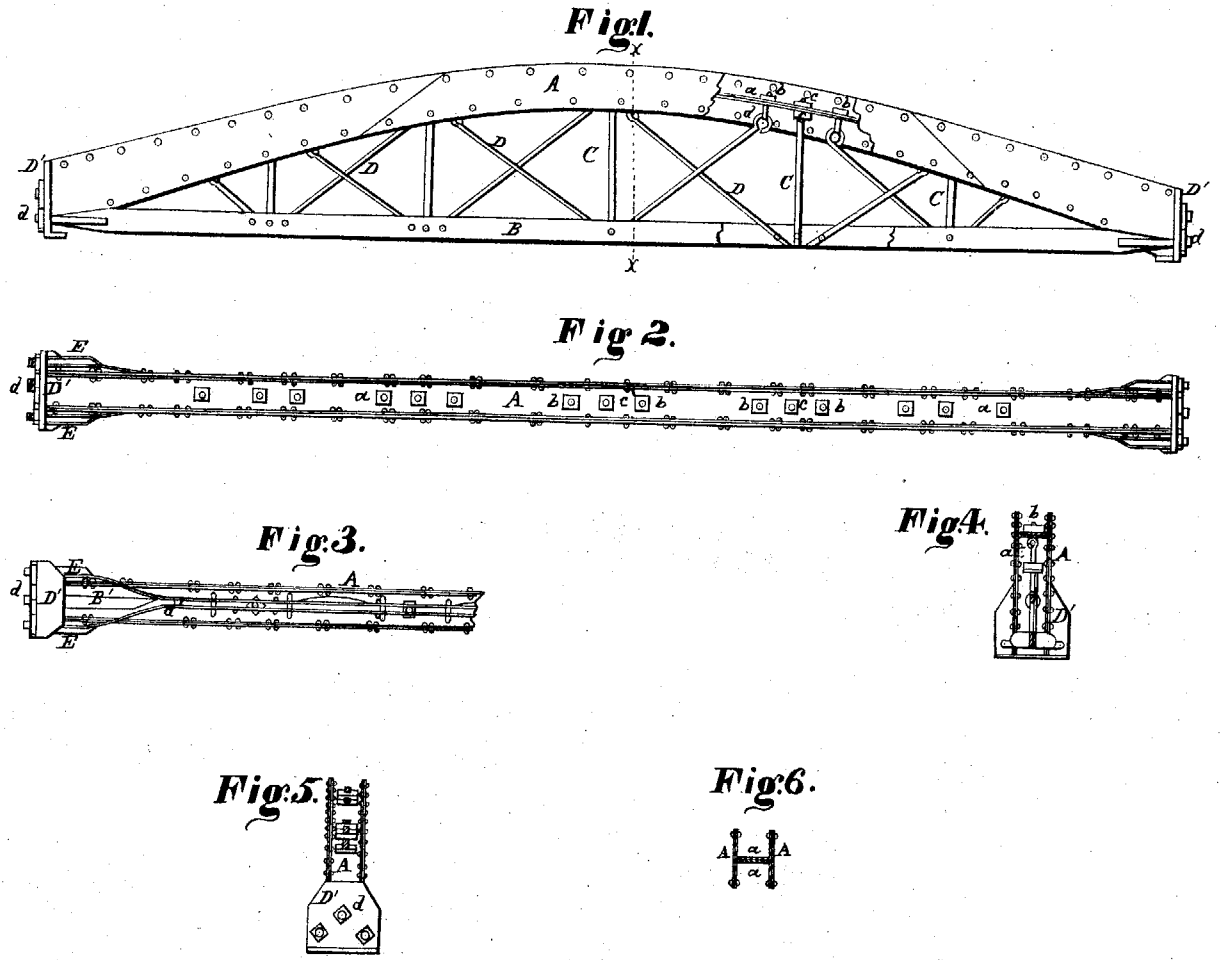
Witnesses.
A. F. Connett
C. E. Russell
Inventor.
Zenas King
Per Burridge & Co.
Attys.
THE GRAPHIC CO. PHOTO-LITH. 39 & 41 PARK PLACE, N.Y.

UNITED STATES PATENT OFFICE.

ZENAS KING, OF CLEVELAND, OHIO.

IMPROVEMENT IN IRON TRUSS-BRIDGES.

Specification forming part of Letters Patent No. 58,266, dated September 25, 1866; reissue No. 6,026, dated August 25, 1874; application filed August 3, 1874.

*To all whom it may concern:*

Be it known that I, ZENAS KING, of Cleveland, in the county of Cuyahoga and State of Ohio, have invented certain new and useful Improvements on Bridges, being an improvement on the bridge patented to P. M. Frees and myself, October 1, 1861; and I do hereby declare that the following is a full, clear, and complete description and specification of the same, reference being had to the accompanying drawings.

My invention relates to bridges constructed mostly of iron, the roadways of which are supported by lower chords, connected by verticals to arches or upper chords, the ends of the latter being prevented from spreading apart by said lower chords acting as bow-strings. As the arches or upper chords of such bridges cannot be connected with each other at many points to prevent lateral vibration, it is very important that the metal from which they are made be so distributed as to prevent this vibration, and at the same time furnish sufficient strength to sustain the greatest load liable to be put on the bridge, with the least weight of metal. This my invention does accomplish; and to this end it consists, first, in arranging the arches or upper chords of bridges in sections abutted together, and so connected by lapping plates that they form continuous H-shaped bent or curved pieces, their central webs at the top lying substantially horizontal, and parallel with the roadway crosswise, and inclining toward a vertical plane toward their ends, between their sides standing in vertical planes. Secondly, my invention consists in combining arches or upper chords of bridges, constructed as herein set forth, substantially, with lower chords and verticals, &c., which combinations are set forth specifically at the end of this schedule.

In order that persons skilled in the art may understand, make, and use my invention, I will proceed to describe my improvements as I have applied them; but it will be obvious to scientific constructers that various modifications may be made without departing from the spirit of my invention.

Figure 1 is a side view of one of the arches of the bridge. Fig. 2 is a top view of the same. Fig. 3 is a view of a portion of the under side of the same. Fig. 4 is a vertical cross-section of the arch or upper chord. Fig. 5 is a detached section and end view of the arch. Fig. 6 is a cross-section of a part of the arch or upper chord.

A represents the arch or upper chord, and B the lower chord or bow-string. To the arch or upper chord are connected suspension-rods C and braces D, fastened to the central web *a* *a* at one end, and to the lower chords B at the other. The arch or upper chord is put together in sections abutted together at their ends, and shaped in the form of the capital letter H, as shown in Fig. 6, and are united by plates lapping over the joints, riveted or bolted to each other. In this instance these uniting-plates are cut diagonally, and are riveted to the sides. They are also made wider at the ends than at the middle of the arch; but I contemplate making them of uniform width. The lower chord or bow-string B is composed of two pieces. The ends of the rods C and braces D are flattened and riveted between these pieces, the rivets passing through the chord, or braces and chord. The upper ends of these braces are connected to the upper chord by means of an eye, *d'*, that is attached to said chord by means of the nut *b*, and the ends of the braces hook into the eye *d'*, forming a hook and eye. The rods C are connected to the chord by means of nuts *c*, one above and one below the parts *a* of the chord, a portion of the chord being broken away in Fig. 1 to show the connection.

The chord A is wider at the ends than in the center, as shown, giving it more strength; or the arch may be of the same width at the ends as at the center. The ends abut against the foot-plate D', which is of the shape shown. To the plate D' is connected the chord or stringer B by means of nuts *d*. The ends of the upper chord are curved down, as shown, and come against the foot-plate D', as stated. The two pieces of the stringer B part, and one passes over the side of the chord A to the plate, and the other piece passes round the other side, each terminating in bolts E E, and connected to said plate by nuts *d*, as before stated, and shown in Fig. 3, being a view of a portion of the under side. Between the pieces of the stringer B is a rod, B', which is united at *d* to the stringer, and passes along to the foot-plate, to which it is connected by means of a screw-nut.

The braces D″, being connected by a hook and eye, allow the truss or bridge thus connected to expand or contract, according to the changes of the weather. The joints being loose, they can expand without breaking, and the nuts at the end of the plates D′, which connect the stringer B and bolt B′, can be loosened or tightened, according to the changes of the weather. If the chord A contracts, it can be loosened by means of said nuts, or it can be tightened, if desired; and if more tension is desired to be given to the truss, it can be given by means of the nuts, and by this means the floor can be raised if it sags.

Having now fully described my invention, what I claim as my invention, and desire to secure by Letters Patent, is—

1. The arrangement, substantially as set forth, of the arch or upper chord of a bridge in sections, with their ends abutted together, and connected by plates riveted or bolted to each section over their joints, in such manner as to form one continuous piece, whose cross-section is in the shape of the letter H, having a web bent in the form of a polygon or curve, lying centrally between and connecting two side pieces standing in parallel planes at right angles to said web, for the purpose set forth.

2. The combination of the H-shaped arch or upper chord of a bridge, having two parallel sides connected by a central web and made in sections, united substantially as set forth, with the vertical, connecting said central web directly with the lower chord, substantially as herein set forth.

3. The combination, substantially as herein set forth, of two or more H-shaped arches or upper chords, with their parallel sides standing in vertical planes, and their central webs lying substantially horizontal at the top of the arch or upper chord, and inclining toward a vertical plane toward their ends, with the roadway supported on lower chords connected by verticals to said central web, the whole forming a complete bridge, substantially as set forth.

4. In all arched bridges, the combination, substantially as herein set forth, of two or more arches composed of wrought-iron, made in the form of an H, their side flanges placed in vertical planes, and the verticals from the central webs of said beams to the lower chords connected to said webs, substantially in the manner described.

ZENAS KING.

Witnesses:
A. F. CORNELL,
J. H. BURRIDGE.